US006164123A

United States Patent [19]

Corkill

[11] Patent Number: 6,164,123
[45] Date of Patent: Dec. 26, 2000

[54] FUEL SYSTEM LEAK DETECTION

[75] Inventor: William John Corkill, Leics, United Kingdom

[73] Assignee: Ford Global Technologies, Inc., Dearborn, Mich.

[21] Appl. No.: 09/347,731

[22] Filed: Jul. 6, 1999

[51] Int. Cl.[7] .......... G01M 3/26

[52] U.S. Cl. .......... 73/49.7; 73/40; 73/49.2; 73/118.1; 123/518; 123/519; 123/520; 702/51

[58] Field of Search .......... 73/40, 49.2, 49.7, 73/118.1; 702/51; 123/518, 519, 520

[56] References Cited

U.S. PATENT DOCUMENTS

| | | | |
|---|---|---|---|
| 5,267,470 | 12/1993 | Cook | 73/49.7 |
| 5,333,590 | 8/1994 | Thomson | 123/520 |
| 5,408,866 | 4/1995 | Kawamura et al. | 73/40 |
| 5,467,641 | 11/1995 | Williams et al. | 73/49.7 |
| 5,490,414 | 2/1996 | Durschmidt et al. | 73/49.2 |
| 5,495,749 | 3/1996 | Dawson et al. | 73/49.7 |
| 5,542,397 | 8/1996 | Takahata et al. | 123/516 |
| 5,675,073 | 10/1997 | Otsuka | 73/40.5 R |
| 5,679,890 | 10/1997 | Shinohara et al. | 73/118.1 |
| 5,696,317 | 12/1997 | Rychlick | 73/118.1 |
| 5,726,354 | 3/1998 | Nomura et al. | 73/118.1 |
| 5,739,421 | 4/1998 | Iochi et al. | 73/49.7 |
| 5,750,888 | 5/1998 | Matsumoto et al. | 73/118.1 |
| 5,765,121 | 6/1998 | Schwager et al. . | |
| 5,817,925 | 10/1998 | Cook et al. | 73/40 |
| 5,878,727 | 3/1999 | Huls | 123/520 |
| 5,898,103 | 4/1999 | Denz et al. | 73/49.2 |
| 5,955,658 | 9/1999 | Wallrafen | 73/49.2 |
| 5,964,812 | 10/1999 | Schumacher et al. | 701/31 |
| 6,016,690 | 1/2000 | Cook et al. | 73/49.2 |
| 6,044,314 | 3/2000 | Cook et al. | 701/31 |
| 6,073,487 | 6/2000 | Dawson | 73/118.1 |
| 6,082,337 | 7/2000 | Fujimoto et al. | 123/520 |
| 6,089,081 | 7/2000 | Cook et al. | 73/118.1 |
| 6,105,556 | 8/2000 | Takaku et al. | 123/520 |

*Primary Examiner*—Hezron Williams
*Assistant Examiner*—Charles D. Gerber
*Attorney, Agent, or Firm*—Jennifer Stec

[57] ABSTRACT

A vehicle fuel system has on-board diagnostics for leak testing with correction for different operating conditions. An electronic control unit (ECU) is arranged to carry out a periodic two stage leak test, when the engine is running. Stage A includes evacuation of the fuel tank, monitoring bleedup and recording the pressure rise dP_A over a predetermined period A following increase of pressure to a predetermined value p2. Stage B includes measuring the amount dP_B by which the pressure in the tank rises above atmospheric due to vapor generation over a predetermined period B following venting and closure fuel system. The ECU calculates a value X representative of leakage from the difference between dP_A and dP_B using a scaling factor K. The test duration is adjusted in accordance with measured values of fuel level and ambient temperature to ensure that the measured pressure changes are dependent on leakage over a range of operating conditions.

14 Claims, 2 Drawing Sheets

| Table of Values for Test Duration (period_A) in seconds | | Fuel Level - % of Full Tank | | | |
|---|---|---|---|---|---|
| | | 85% | 65% | 40% | 10% |
| Ambient Temperature - T | 0°C | 8 | 15 | 25 | 35 |
| | 20°C | 7 | 13 | 22 | 30 |
| | 30°C | 6 | 11 | 20 | 27 |
| | 40°C | 5 | 9 | 11 | 18 |

FUEL SYSTEM LEAK DETECTION

FIELD OF THE INVENTION

This invention relates to a vehicle fuel system with on-board diagnostics for evaporative leak testing.

BACKGROUND OF THE INVENTION

Vehicle fuel systems are required to control emission of fuel vapor. This is done by collecting vapor emitted from the fuel tank in a purge canister containing carbon to absorb the vapor. The canister is purged of collected vapor when the engine is running by drawing air through the canister into the engine, relying on manifold vacuum. The system is sealed except for venting to the atmosphere via the purge canister. On-board evaporative leak testing is required to ensure that leakage from the sealed system does not exceed acceptable limits. Typical known leak testing systems are described U.S. Pat. Nos. 5,333,590 and 5,765,121.

The latter patent describes a basic test in which the manifold vacuum is used to pump out the fuel tank and the return of tank pressure to atmospheric ("bleedup") is monitored. If bleedup exceeds a certain threshold value R the system is determined to have an unacceptable leak. If the bleedup is less than R, it assumed that there is no such leak. Leaks of less that a certain size cannot be reliably detected with this basic system because vapor generation from fuel in the tank can cause pressure in the evacuated system to recover more rapidly than small leaks. Thus, in order to improve the sensitivity of the basic bleedup test, measures must be taken to correct for different operating conditions, particularly the rate of vapor generation in the tank which causes a more or less gradual increase in pressure in a sealed tank, even where there is no leak, and may give a false indication of leakage.

For example, U.S. Pat. No. 5,333,590 uses a threshold value R which is not fixed but is related to vapor volume and fuel temperature.

The present invention seeks to make further improvements to evaporative fuel system leak testing to enable smaller leaks to be reliably detected under varying ambient and operating conditions.

SUMMARY OF THE INVENTION

According to the present invention a vehicle fuel system with on-board diagnostics for leak testing comprises:

a) a fuel tank for containing fuel for delivery to an internal combustion engine;

b) a purge canister connected to the space in the tank above the fuel;

c) a canister vent valve (CVV) for connecting the purge canister to the atmosphere;

d) a purge valve for connecting the purge canister to the engine; and e) an electronic control unit (ECU) arranged for monitoring pressure and fuel level in the tank and for controlling opening and closing of the valves;

f) the CVV and the purge valve being controlled by the ECU for venting the tank to atmosphere via the purge canister (purge valve closed, CVV open), and for purging vapor from the canister by allowing air to be drawn through the canister by manifold vacuum (both valves open);

g) the ECU being arranged to carry out a periodic leak test, when the engine is running, h) the leak test including:

i) evacuation of the tank with the purge valve open and the CVV closed;

ii) monitoring pressure rise in the tank with both valves closed;

iii) recording the pressure rise dP_A over a period (period_A) following increase of tank pressure to a predetermined value p2; and iv) calculations using dP_A to determine whether or not unacceptable leakage is occurring; and i) period_A being adjusted in accordance with fuel level/vapor volume, a shorter period_A being used for higher fuel levels (lower vapor volume) and a longer period_A being used for lower fuel levels (higher vapor volume)

Preferably, values of period_A are stored in a 2-dimensional map or table giving a value of period_A for combinations of measured values of fuel level and ambient temperature. The leak test is sensitive to vapor volume in the system but it is more convenient to measure fuel level, which is simply and directly related to vapor volume, since vehicles are equipped with means for sensing fuel level. The rate of vapour generation is more directly related to fuel temperature than ambient temperature but it is more convenient to use ambient temperature, for which a sensor is usually available in most vehicles than to provide an additional temperature sensor dedicated to fuel temperature.

The improved fuel system test contemplated by the invention is preferably implemented using the vehicle's existing electronic engine control unit and the fuel system pressure sensor which is used for other purposes. As a consequence, the benefits of the invention may be obtained at very little additional cost.

These and other features and advantages of the present invention may be better understood by considering the following detailed description of a preferred embodiment of the invention.

During the course of this description, frequent reference will be made to the attached drawings.

BRIEF DESCRIPTION OF THE DRAWINGS

FIG. 4 shows a shorter test duration (7 seconds) used when fuel level is higher (tank a 85% full) at the same ambient temperature.

DESCRIPTION OF THE PREFERRED EMBODIMENT

Figures 1, 2:
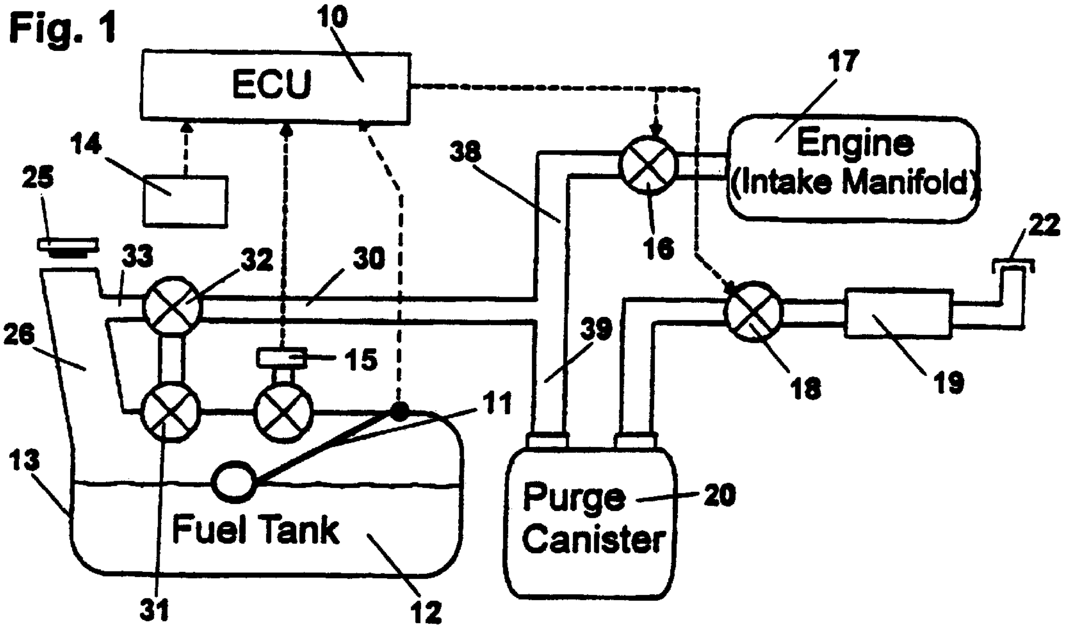
FIG. 1 is a schematic diagram of a vehicle fuel system with on-board diagnostics for leak testing which utilizes the principles of the invention.
FIG. 2 is a table showing information stored in the electronic control unit of the embodiment of FIG. 1.

A two stage diagnostic procedure for leak testing is performed automatically at predetermined intervals by an electronic control unit (ECU) 10 seen in FIG. 1. The test is aborted if prevailing conditions (fuel sloshing, heavy acceleration etc) are such that a reliable test result cannot be expected.

The ECU 10 is connected to a fuel sender 11 for sensing the level of fuel 12 in a fuel tank 13, an ambient temperature transducer 14, and a fuel tank pressure sensor 15.

The ECU controls a vapor management valve (VMV) 16 commonly referred to in the art as a purge valve, and a normally open canister vent valve (CVV) 18. The CVV controls the air flow through a filtered passageway 19 which connects a purge canister 20 containing charcoal for absorbing fuel vapor to an atmospheric vent 22. The VMV 16, when open, connects the purge canister 20 to the intake manifold 17 of the vehicle engine via lines 38 and 39.

The closed fuel system seen in FIG. 1 further includes a vacuum/pressure relief valve within a cap 25 which closes the fuel inlet passageway 26 of the fuel tank 13. A passageway 30 extends from a rollover valve 31 at the top of the tank 13 to both the purge canister 20 and the VMV 16. A running-loss vapor control valve 32 connects the passageway 30 to the upper portion of the fuel inlet passageway 26 via a branch passageway 33.

When the vehicle engine in not running the ECU closes the VMV 16 and opens the CVV 18 so that fuel vapor is absorbed by carbon in the purge canister before reaching the atmosphere. Moreover, air may enter the fuel system via the purge canister 20 if pressure in the tank falls below atmospheric due to condensation of vapor. When the engine is running the ECU from time to time opens both VMV 16 and CV 18 so that air is drawn through the purge canister by manifold vacuum to purge fuel vapor from the canister.

Figure 3:
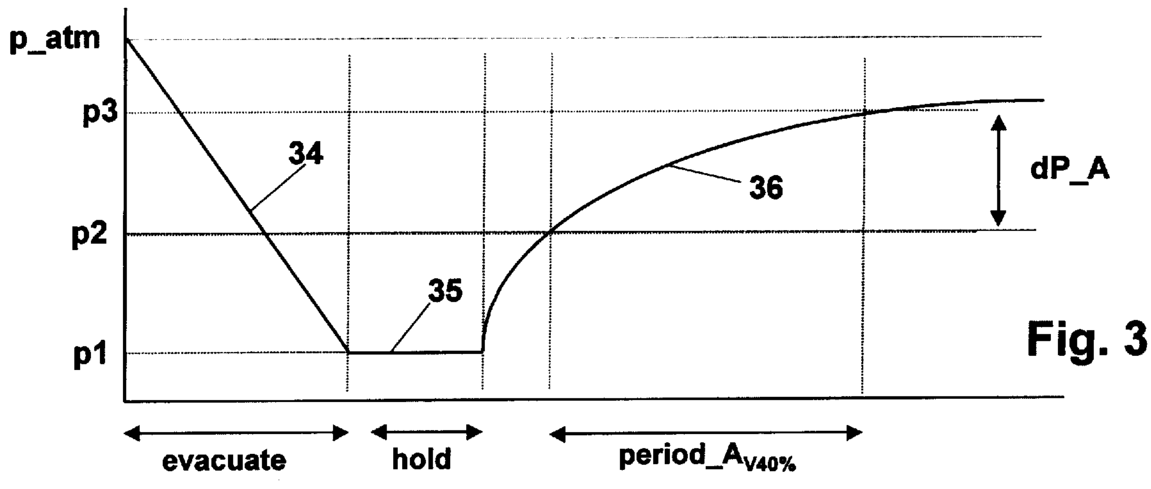
FIGS. 3 and 4 are graphs of the pressure changes which take place in a first stage of the leak test carried out in the system shown in FIG. 1, FIG. 3 showing a longer (22 seconds) test duration used when fuel level is relatively low (tank 40% full) and ambient temperature is 20° C.
Figure 4:
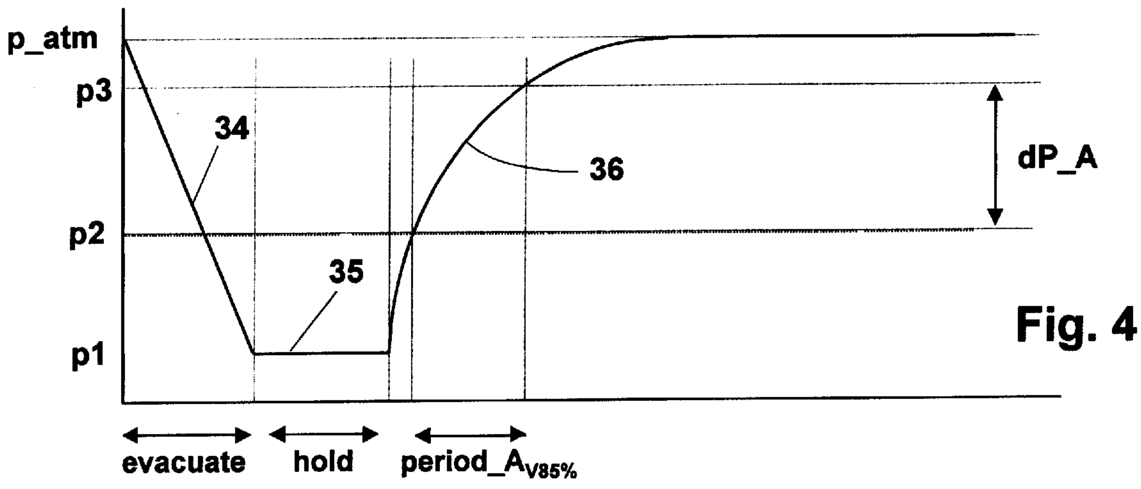

The diagnostic leak testing procedure takes place in two stages. In stage A the pressure changes in the tank 13 as measured by the pressure sensor 15 are illustrated in FIGS. 3 and 4. During an evacuation phase 34 the ECU closes the CVV 18 and opens the VMV 16 so that air and vapor are pumped out of the tank 13 and canister at 44 by manifold vacuum until a desired pressure p1 is achieved. The evacuation phase is followed by a holding stage 35 of several seconds to allow conditions in the tank to approach a steady state and reduce variability due to the speed of evacuation (which is influenced by whether VMV 16 is fully or partially open together with the level of manifold vacuum, in turn influenced by engine load and throttle position). After the holding phase, the ECU closes both the VMV 16 and the CVV 18, sealing the system. The tank pressure as indicated by the pressure sensor 15 is monitored by the ECU during a bleedup phase 36. At point in time that the tank pressure recovers to p2, the ECU starts counting out period_A monitors the pressure p3at the end of period_A and calculates and saves the pressure difference dP_A=p2–p3.

FIG. 3 shows a typical bleedup with the tank 40% full and ambient temperature 20° C. FIG. 4 shows a typical bleedup with the tank 85% full and at the same ambient temperature of 20° C.

The ECU looks up the value of period_A to be used in the table shown in FIG. 2 giving a period_A=22 seconds for tank 40% full and temperature 20° C. and period_A=7 seconds for tank 85% full at the same temperature. The values for period_A entered in the table of FIG. 2 are chosen to give pressure p3 where there is no leak that is in a mid-range between p2 and p_atm. This is to ensure that leakage a the level to be detected will produce a measurable difference in dP_A over a range of different fuel levels and ambient temperatures. It can readily be seen from a comparison of the graphs of FIGS. 3 and 4 that use of the longer 22 second period used in the is FIG. 3 environment for the different environment of FIG. 4 would have the result that a small leak could not be detected because both leak and no leak would produce the same value dP_A=p_atm—p2.

Figure 5:
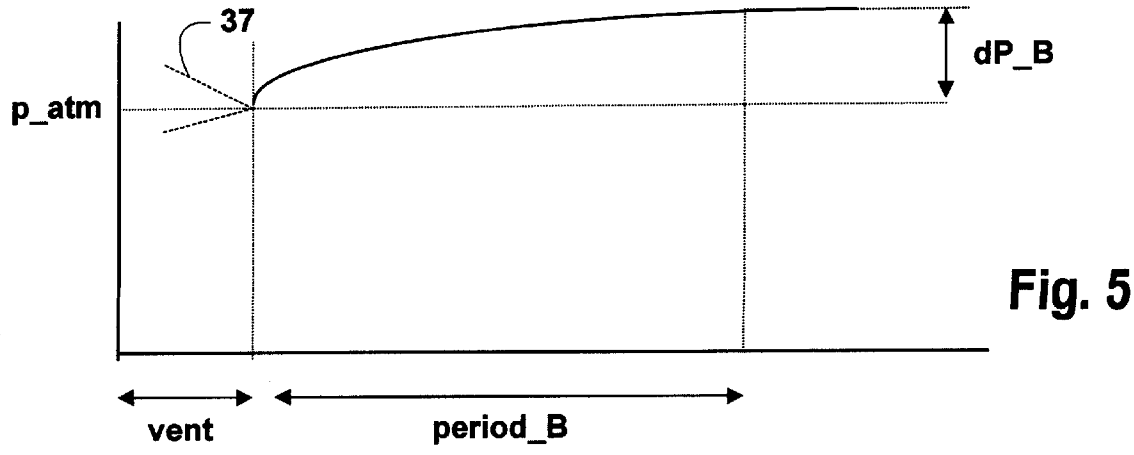
FIG. 5 is a graph of the pressure changes which take place in a second stage of the leak test carried out in the system shown in FIG. 1.

In stage B, which may take place before or after stage A, the pressure changes in the tank 13 are as illustrated in FIG. 5. After initial venting 37 to allow the pressure to go to atmospheric, the ECU closes both the CVV 18 and the VMV 16 and starts period_B. During period_B, the pressure will normally rise due to vapor generation, but will rise more slowly if there is a leak. Under certain conditions of venting the pressure may fall. Rapid venting may produce transient temperature effects and under certain conditions vapor may condense in the tank.

At the end of period_B, the ECU monitors the tank pressure p4 and calculates and saves the pressure increase above atmospheric dP_B=p4—p_atm.

Although not shown in the drawings, period_B is also adjusted for different fuel levels and ambient temperatures. This may be done using the same table as in FIG. 2, with a fixed ratio between period_A and period_B.

The ECU calculates a leakage indicating variable X using the relationship:

X=dP_A—K*dP_B

The ECU compares X to a threshold level R, which is also mapped against fuel level and ambient temperature in a separate table (not shown). If X is above the threshold R a leak warning is generated by the ECU.

K may also be mapped against ambient temperature and fuel level.

The mapped values for test duration, threshold R and optionally K, are determined empirically by carrying out the two stage test described on a fuel systems with a leak of about the size to be detected at various operating conditions.

Test duration and threshold R may also be mapped against ambient pressure, engine speed or engine load or any combination of these measured variables with tank pressure and ambient temperature.

It is to be understood that the embodiment of the invention described above is merely illustrative on one application of the principles of the invention. Numerous modifications may be made to the methods and apparatus described without departing from the true spirit and scope of the invention.

What is claimed is:

1. A vehicle fuel system with on-board diagnostics for leak testing comprises:

a) a fuel tank for containing fuel for delivery to an internal combustion engine;

b) a purge canister connected to the space in the tank above the fuel;

c) a canister vent valve (CVV) for connecting the purge canister to the atmosphere;

d) a purge valve for connecting the purge canister to the engine; and e) an electronic control unit (ECU) arranged for monitoring pressure and fuel level in the tank and for controlling opening and closing of the valves;

f) the CVV and the purge valve being controlled by the ECU for venting the tank to atmosphere via the purge canister (purge valve closed, CVV open), and for purging vapor from the canister by allowing air to be drawn through the canister by manifold vacuum (both valves open);

g) the ECU being arranged to carry out a periodic leak test, when the engine is running, h) the leak test including:

i) evacuation of the tank with the purge valve open and the CVV closed;

ii) monitoring pressure rise in the tank with both valves closed;

iii) recording the pressure rise dP_A over a period_A following increase of tank pressure to a predetermined value p2; and iv) calculating using dP_A to determine whether or not unacceptable leakage is occurring; and v) venting the tank to atmospheric pressure via the CVV then sealing the tank by closing the CVV; and vi) measuring the amount dP_B by which the pressure in the tank rises above atmospheric due to vapor generation over a period_B following closure of the CVV;

the ECU being arranged to calculate a value X representative of leakage from the difference between dP_A and dP_B using a scaling factor K and to compare X with a threshold level R indicative of leakage below acceptable levels;

i) period A being adjusted in accordance with fuel level/vapor volume, a shorter period A being used for higher fuel level (lower vapor volume) and a longer period A being used for lower fuel level (higher vapor volume).

2. A vehicle fuel system as claimed in claim 1 in which the ECU uses stored information giving values to be used for period_A for measured values of fuel level.

3. A vehicle fuel system as claimed in claim 1 in which the ECU uses two dimensional table of stored information giving values to be used for period_A for measured values of ambient air temperature and fuel level.

4. A fuel system as claimed in claim 1 in which period_B is adjusted in accordance with fuel level and/or ambient temperature in line with the adjustment of period_A .

5. A fuel system as claimed in claim 4 in which R is adjusted for different fuel levels and/or ambient temperatures to compensate for the use of different test durations.

6. A fuel system as claimed in claim 5 in which the test durations (period_A and period_B) and the threshold level R are adjusted for both fuel level and ambient temperature.

7. A vehicle fuel system claim 1 in which the leak test includes a further stage with on-board diagnostics for leak testing comprises:

a) a fuel tank for containing fuel for delivery to an internal combustion engine;

b) a purge canister connected to the space in the tank above the fuel;

c) a canister vent valve (CVV) for connecting the purge canister to the atmosphere;

d) a purge valve for connecting the purge canister to the engine; and e) an electronic control unit (ECU) arranged for monitoring pressure and fuel level in the tank and for controlling opening and closing of the valves;

f) the CVV and the purge valve being controlled by the ECU for venting the tank to atmosphere via the purge canister (purge valve closed, CVV open), and for purging vapor from the canister by allowing air to be drawn through the canister by manifold vacuum (both valves open);

g) ECU uses stored information giving values to be used for period_A for measured values of fuel level, the ECU being arranged to carry out a periodic leak test, when the engine is running, h) the leak test including:

i) evacuation of the tank with the purge valve open and the CVV closed;

ii) monitoring pressure rise in the tank with both valves closed;

iii) recording the pressure rise dP_A over a period_A following increase of tank pressure to a predetermined value p2; and iv) calculating using dP_A to determine whether or not unacceptable leakage is occurring; and v) venting the tank to atmospheric pressure via the CVV then sealing the tank by closing the CVV; and vi) measuring the amount dP_B by which the pressure in the tank rises above atmospheric due to vapor generation over a period_B following closure of the CVV; the ECU being arranged to calculate a value X representative of leakage from the difference between dP_A and dP_B using a scaling factor K and to compare X with a threshold level R indicative of leakage below acceptable levels; and i) period A being adjusted in accordance with fuel level/vapor volume, a shorter period A being used for higher fuel level (lower vapor volume) and a longer period A being used for lower fuel level (higher vapor volume).

8. A vehicle fuel system claim 3 in which the leak test includes a further stage with onboard diagnostics for leak testing comprises:

a) a fuel tank for containing fuel for delivery to an internal combustion engine;

b) a purge canister connected to the space in the tank above the fuel;

c) a canister vent valve (CVV) for connecting the purge canister to the atmosphere;

d) a purge valve for connecting the purge canister to the engine; and e) an electronic control unit (ECU) arranged for monitoring pressure and fuel level in the tank and for controlling opening and closing of the valves;

f) the CVV and the purge valve being controlled by the ECU for venting the tank to atmosphere via the purge canister (purge valve closed, CVV open), and for purging vapor from the canister by allowing air to be drawn through the canister by manifold vacuum (both valves open);

g) ECU uses a two-dimensional table of stored information giving values to be used for period_A for measured values of ambient air temperature and fuel level, the CU being arranged to carry out a periodic leak test, when the engine is running, h) the leak test including:

i) evacuation of the tank with the purge valve open and the CVV closed;

ii) monitoring pressure rise in the tank with both valves closed;

iii) recording the pressure rise dP_A over a period_A following increase of tank pressure to a predetermined value p2; and iv) calculating using dP_A to determine whether or not unacceptable leakage is occurring; and v) venting the tank to atmospheric pressure via the CVV then sealing the tank by closing the CVV; and vi) measuring the amount dP_B by which the pressure in the tank rises above atmospheric due to vapor generation over a period_B following closure of the CVV; the ECU being arranged to calculate a value X representative of leakage from the difference between dP_A and dP_B using a scaling factor K and to compare X with a threshold level R indicative of leakage below acceptable levels; and i) period A being adjusted in accordance with fuel level/vapor volume, a shorter period A being used for higher fuel level (lower vapor volume) and a longer period A being used for lower fuel level (higher vapor volume).

9. A method for leak testing a vehicle fuel system in a vehicle having on-board diagnostics, the vehicle including a fuel tank containing fuel for delivery to an internal combustion engine and a purge canister connected to a space in the tank above the fuel, a canister vent valve (CVV) for connecting the purge canister to the atmosphere, a purge valve for connecting the purge canister to the engine and an electronic control unit (ECU) arranged for monitoring pressure and fuel level in the tank and for controlling opening and closing of the valves, the method comprising the steps of:

determining the engine is running;

evacuating the tank with the purge valve open and the CVV closed;

monitoring pressure rise in the tank with both valves closed;

recording the pressure rise dP_A over a period A following increase of tank to a predetermined value p2; and performing calculations using dP_A to determine whether or not an unacceptable leakage is occurring;

adjusting period A in accordance with fuel level/vapor volume, a shorter period A being used for higher fuel level (lower vapor volume) and a longer period A being used for lower fuel level (higher vapor volume);

venting the tank to atmospheric pressure via the CVV then sealing the tank by closing the CVV;

measuring the amount dP_B by which the pressure in the tank rises above atmospheric due to vapor generation over a period_B following closure of the CVV; and calculating a value X representative of leakage from the difference between dP_A and dP_B using a scaling factor K and to compare X with a threshold level R indicative of leakage below acceptable levels, i) venting the tank to atmospheric pressure via the CVV then sealing the tank by closing the CVV; and ii) measuring the amount dP_B by which the pressure in the tank rises above atmospheric due to vapor generation over a period_B following closure of the CVV; and calculating a value X representative of leakage from the difference between dP_A and dP_B using a scaling factor K and to compare X with a threshold level R indicative of leakage below acceptable levels.

10. A test as claimed in claim 9, further comprising the steps of storing values in the ECU for use as period_A for measured values of fuel level.

11. A test as claimed in claim 9, further comprising the step of providing a two dimensional table of stored information in the ECU for use as values for period_A for measured values of ambient air temperature and fuel level.

12. A test as claimed in claim 9, further comprising the step of adjusting period_B in accordance with fuel level and/or ambient temperature in line with the adjustment of period_A.

13. A test as claimed in claim 12, further comprising the step of adjusting R for different fuel levels and/or ambient temperatures to compensate for the use of different test durations.

14. A test as claimed in claim 13, further comprising the step of adjusting period_A , period_B and the threshold level R based on fuel level and ambient temperature.

* * * * *